United States Patent

Kinoshita et al.

[11] Patent Number: 5,891,561
[45] Date of Patent: Apr. 6, 1999

[54] POWER TRANSMISSION BELT WITH LOAD CARRYING CORD

[75] Inventors: Takashi Kinoshita, Hyogo; Hitoshi Hasaka, Kobe, both of Japan

[73] Assignee: Mitsuboshi Belting Ltd., Hyogo, Japan

[21] Appl. No.: 761,403

[22] Filed: Dec. 6, 1996

[51] Int. Cl.[6] .................................................. D04H 1/04
[52] U.S. Cl. .................. 428/295.1; 428/375; 428/300.4; 428/390; 428/297.4; 474/161; 474/266; 474/268; 474/263; 474/205; 474/271
[58] Field of Search ...................... 474/205, 271, 474/267, 268, 250, 263, 260, 266, 161; 428/364, 325, 365, 377, 390, 395, 397, 266, 268, 375, 295.1, 296.4, 297.7, 300.4, 297.4; 57/214; 442/59

[56] References Cited

U.S. PATENT DOCUMENTS

| | | | |
|---|---|---|---|
| 5,098,346 | 3/1992 | Redmond | 474/161 |
| 5,178,586 | 1/1993 | Mizuno et al. | 474/266 |
| 5,250,010 | 10/1993 | Mishima et al. | 474/263 |
| 5,306,213 | 4/1994 | Nakajima et al. | 474/205 |
| 5,521,007 | 5/1996 | Kurokawa | 428/364 |
| 5,545,097 | 8/1996 | Kitazumi et al. | 474/266 |
| 5,611,745 | 3/1997 | Uto et al. | 474/205 |
| 5,654,099 | 8/1997 | Pelton | 428/378 |

*Primary Examiner*—Merrick Dixon
*Attorney, Agent, or Firm*—Wood, Phillips, VanSanten, Clark & Mortimer

[57] ABSTRACT

A component for a power transmission belt. The component is a fiber cord that is treated in a first step with at least one of a) an isocyanate compound and b) an epoxy compound such that after the first step the at least one of the isocyanate compound and epoxy compound is present in solid form in an amount equal to 0.5 to 2.0 weight %. The fiber cord is treated after the first step in a second step with an RFL liquid so that the percentage void in the cord, as determined by the following formula, is not greater than 1.5%:

percentage void=$100 \times A_y/A_x$, where $A_x$ is the total surface area of the cord and $A_y$ is the void area.

6 Claims, 1 Drawing Sheet

POWER TRANSMISSION BELT WITH LOAD CARRYING CORD

BACKGROUND OF THE INVENTION

1. Field of the Invention

This invention relates to power transmission belts and, more particularly, to power transmission belts having load carrying fiber cords therein.

2. Background Art

Aramid cords are being widely used as load carrying elements in power transmission belts. Aramid fiber has higher strength and a higher modulus than many other organic fibers. Aramid fiber also has excellent dimensional stability. One drawback with aramid cords being used in power transmission belts is that the cords are prone to fraying. This is particularly a problem in belts which have cut, pulley-engaging side surfaces so that the belt rubber, and the load carrying cords embedded therein, are directly exposed to cooperating pulleys in operation. This construction is typical of all types of power transmission belts, including V-belts, V-ribbed belts, and toothed belts. In this environment, the cords may also break loose from the side surfaces of the belts. Many studies have been undertaken to address this problem. Many of these studies have been specifically focused on the automotive industry, in which there is a demand for load carrying cords exhibiting good adhesion, minimal fraying, and good bending fatigue resistance.

To enhance the performance of the load carrying cords, it is known to treat the cords using resorcinol-formalin-rubber latex adhesive liquid (hereinafter RFL liquid). It is also known to pre-treat the load carrying cords with an epoxy compound, an isocyanate compound, or the like, before subjecting the cords to the RFL liquid treatment.

In Japanese Patent Publication No. H.7-72578, a cord is disclosed having initially untwisted ribbon-shaped 300–3100 denier aramid fiber filaments that are adhesive treated with a liquid that is either an epoxy or isocyanate compound. The filaments are lower twisted into strands, with two of the strands then upper twisted. The twisted strands are then either adhesive treated with rubber cement or treated with an RFL liquid followed by an adhesive treatment with rubber cement The coefficient (X) of the upper twist is 1–4 with the coefficient (Y) of the lower twist being −1–1. The upper twist coefficient (X) and the lower twist coefficient (Y) are set in a specific relationship to improve cohesion and improve the fraying problem.

It has been found that in using an RFL liquid treatment alone, the bending performance of the cords is good, but they tend to fray. It has also been found that using RFL liquid after pre-treating with an epoxy isocyanate compound tends to harden the cord. While this improves the fraying properties, the bending fatigue resistance is unsatisfactorily diminished.

Further, by controlling the twists of the cord components, the fraying properties have been improved, however, this alone does not make the aramid fibers suitable as load carrying members in a power transmission belt in the automotive environment.

After much study by the applicant of mechanical properties of a conventionally treated cord, it has been found that there are many voids in these cords. It has been determined that these voids cause fraying to occur.

SUMMARY OF THE INVENTION

In one form of the invention, a component is provided for a power transmission belt The component is a fiber cord that is treated in a first step with at least one of a) an isocyanate compound and b) an epoxy compound such that after the first step the at least one of the isocyanate compound and epoxy compound is present in solid form in an amount equal to 0.5 to 2.0 weight %. The fiber cord is treated after the first step in a second step with an RFL liquid so that the percentage void in the cord, as determined by the following formula, is not greater than 1.5%:

percentage void=$100 \times A_y/A_x$, where $A_x$ is the total surface area of the cord and $A_y$ is the void area.

The RFL liquid may be one of hydrogenated acrylonitrile-butadiene rubber latex and acrylonitrile-butadiene rubber latex.

The fiber cord may be at least one of aramid fiber and polyparaphenylene benzobisoxazole fiber.

In one form, the fiber cord is made up of 2–5 threads with a total denier of 300–3100, with each thread defined by twisting 100–3000 of 1–3 denier monofilaments and upper twisting the threads 4–50 times per 10 cm.

In one form, the isocyanate compound is at least one of 4,4'-diphenyl methane diisocyanate, toluene 2,4-diisocyanate, P-phenyldiisocyanate, and polyarylpolyisocyanate.

In one form, the epoxy compound is at least one of a) a reaction product of a multivalent alcohol with a halogen-containing epoxy compound and b) a reaction product with a multivalent phenol.

The RFL liquid may be made by mixing an initial condensate of formalin and resorcinol with a rubber latex that is at least one of hydrogenated nitrile rubber latex and NBR latex.

In one form, the fiber cord is embedded in rubber as part of a power transmission belt, which rubber is at least one of hydrogenated nitrile rubber (HNBR) nitrile-butadiene rubber NBR), chloroprene rubber (CR), chlorosulfonated polyethylene rubber (CSM) and alkylated chlorosulfonated polyethylene (ACSM).

The invention further contemplates the above cord in combination with at least one additional component to define a power transmission belt that may be, for example, a V-belt, a V-ribbed belt, or a toothed belt. Other belt shapes and style could be made according to the present invention.

The belt may include short, discrete, reinforcing fibers, such as nylon 6, nylon 66, polyester, cotton and aramid.

The above described solid adhered amount of the isocyanate and/or epoxy compounds is relatively small, thereby resulting in a relatively small percentage of voids in the fiber cord. Since the solid content is small, the cord is not appreciably hardened by that solid material and as a result the bending fatigue resistance of the cord is good. The RFL liquid is used to fill a large percentage of the voids such that the cohesion of the filaments defining the cords is good. Fraying characteristics and adhesion properties of the cords may also be improved over prior art cords. The result of this may be a longer belt life compared to prior art belts.

The invention also contemplates a method of forming a cord, of the type described above, as well as a method of forming a power transmission belt incorporating the cord.

The invention further contemplates a power transmission belt having a body with a length, a width between laterally spaced sides, an inside and an outside. At least one load carrying cord is embedded in the body and extends lengthwise of the body. The cord has the construction, described above.

In one form, the sides of the belt are defined at least in part by rubber within which the cord is embedded, with the rubber being directly exposed at the sides of the belt body.

A canvas layer can be provided on one of the inside and outside of the belt.

DETAILED DESCRIPTION OF THE DRAWINGS

Figure 1:
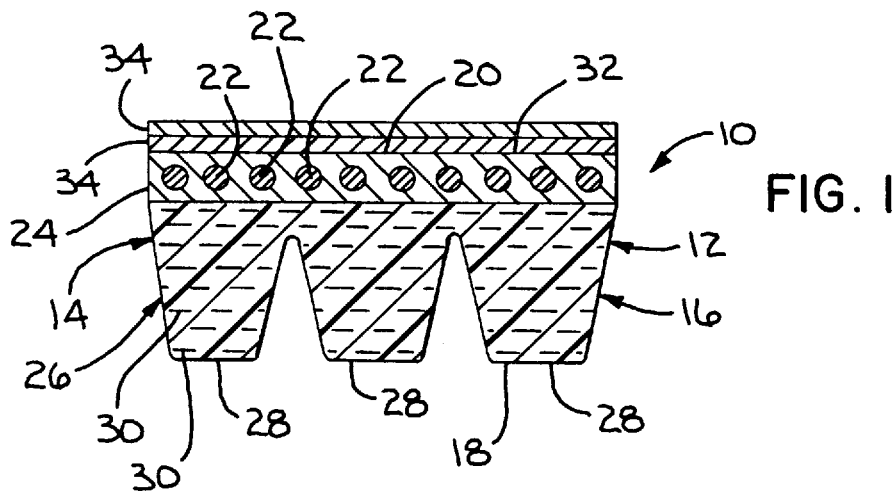
FIG. 1 is a cross-sectional view of a V-ribbed belt, incorporating the present invention.

In FIG. 1, one form of power transmission belt according to the present invention, is shown at 10. The power transmission belt 10 is a V-ribbed belt. The belt 10 has a body 12 with laterally spaced sides 14, 16. The body 12 has an inside surface 18 and an outside surface 20.

A plurality of laterally spaced, load carrying cords 22 are embedded in a cushion rubber layer 24. The load carrying cords 22, which have good strength and resistance to elongation, are preferably made from aramid fiber or polyparaphenylene benzobisoxazole fiber.

A compression layer 26 is provided inside of the cushion rubber layer 24 and has laterally spaced, V-shaped ribs 28 formed therein. Laterally extending, short, discrete, reinforcing fibers 30 are embedded in the compression layer 26.

On the outside surface 32 of the body 12, two layers of rubberized canvas 34 are adhered.

The compression layer 26 is defined by rubber that is preferably at least one of hydrogenated nitrile rubber (HNBR), nitrile-butadiene rubber (NBR), chloroprene rubber (CR), chlorosulfonated polyethylene rubber (CSM), and alkylated chlorosulfonated polyethylene (ACSM). Preferably, the rubber has good resistance to deterioration at high temperatures.

Preferably, the percentage of hydrogen addition in the hydrogenated nitrile rubber is 80% or more. More preferably, for maximum heat and ozone resistance, the hydrogen addition is at least 90%. It has been found that heat resistance and ozone resistance for hydrogenated nitrile rubber fall significantly when the hydrogen addition is less than 80%. To improve oil resistance and cold resistance, an acrylonitrile component can be added in the range of 20–45%.

The short fibers 30 may be nylon 6, nylon 66, polyester, cotton and/or aramid. These fibers 30 resist lateral pressures imparted to the compression layer 26. The fibers 30 are made to project from the sides 14, 16 of the belt body 12 which make contact with cooperating pulleys. This reduces the coefficient of friction between the belt body 12 and the cooperating pulleys and also reduces noise generated between the belt 10 and cooperating pulleys in operation.

Among the fibers 30 mentioned above, aramid fibers are preferred because of their stiffness and strength and further because of their excellent resistance to wear. To maximize the effectiveness of the aramid fibers, in terms of the properties mentioned in the preceding sentence, the fibers 30 are chosen to have a length of 1–20 mm and are added in an amount of 1–30 weight parts per 100 weight parts of hydrogenated nitrile rubber. The preferred aramid fibers are those having aromatic rings in the molecular structure. Suitable examples are being sold commercially under the trademarks CONEX™, NOMEX™, KEVLAR™, TECH-NORA™ and TWARON™.

When the aramid fibers 30 are present in less than 1 weight part, there is a tendency of the rubber in the compression layer 26 to stick as a result of which it may wear excessively. On the other hand, when the fibers 30 exceed 30 weight parts, the fibers 30 do not disperse uniformly in the rubber within the compression layer 24.

In a first step, the cords 22, made from aramid and/or benzobisoxazole fibers, are treated with at least one of an isocyanate compound or an epoxy compound such that after the first step the isocyanate compound and/or epoxy compound is present in solid form in an amount equal to 0.5 to 2.0 weight %. The cord 22 is treated after the first step in a second step with an RFL liquid having hydrogenated nitrile rubber latex or nitrile-butadiene rubber (NBR) latex as a component thereof. After treatment with the RFL liquid, the percentage of voids in the cords 22 is preferably no greater than 1.5%. The percentage of voids is determined by the following formula: void $(\%) = 100 \times A_y/A_x$, where $A_x$ is the total surface area of the cord and $A_y$ is the void area.

It has been found that when the isocyanate compound and/or epoxy compound are present in solid form in less than 0.5 weight %, adhesion between the cords 22 and the rubber in the compression layer 26 diminishes unsatisfactorily. When the solid amount exceeds 2.0 weight percent, the cords 22 tend to harden, as a result of which their bending fatigue resistance is deteriorated.

It has also been found that if the percentage of void after the RFL liquid treatment exceeds 1.5%, the voids become relatively large and the cohesion between filaments in the cords 22 decreases. Also, the fraying problem becomes more significant.

To make the above determinations, a cord 22, treated according to the present invention, was embedded in rubber, which was then vulcanized. The proportion of void area per unit in cross section was expressed with a percentage. For the void area, a cross section of the cord 22 was enlarged with an electron microscope to allow precise area measurement.

The aramid fibers defining the cords 22 are preferably aramid fibers having aromatic rings in the main chain of the molecular structure thereof. Suitable aramid fibers are present on the market and are sold commercially under the trademarks CONEX™, NOMEX™, KEVLAR™, TECH-NORA™ and TWARON™, and the like. The cords 22 are formed by bringing together 2–5 untwisted threads having a total denier of 300–3100, with each thread made by bundling 100–3000 1–3 denier monofilaments and upper twisting these threads 4–50 times per 10 cm.

The invention contemplates that lower twisting and upper twisting can both be carried out. However, when lower twisting is used, sometimes it becomes difficult for the RFL liquid to fully penetrate the cords 22.

Suitable isocyanate compounds, for the above described adhesive treatment, are 4, 4'-diphenyl methane diisocyanate, toluene 2, 4-diisocyanate, P-phenyldiisocyanate, polyarylpolyisocyanate, and similar compounds. The isocyanate compound may be mixed with an organic solvent, such as toluene or methylethylketone.

A suitable epoxy compound, as described above, may be a reaction product of a multivalent alcohol such as ethylene glycol, glycerine, pentaerythritol or a polyalkylene glycol such as polyethylene glycol with a halogen-containing epoxy compound like epichlorohydrin. The epoxy compound could alternatively be a reaction product with a multivalent phenol such as a resorcinol, bis (4-hydroxyphenyl) dimethylmethane, phenol.formaldehyde resin, resorcinol.formaldehyde resin or a halogen-containing epoxy compound. The epoxy compound can be mixed with an organic solvent such as toluene or a methylethylketone.

The RFL liquid can be made by mixing an initial condensate of formalin and resorcinol with a rubber latex that is hydrogenated nitrile rubber latex or nitrile-butadiene rubber (NBR) latex. It is preferable for improving adhesion that the mole ratio of resorcinol/formalin is in the range of 1/0.5–1/3. Then the initial condensate formalin and resorcinol are mixed 10–100 weight parts of resin per 100 weight parts of rubber, with the total solid concentration being adjusted to a concentration of 5–40%.

Figure 2:
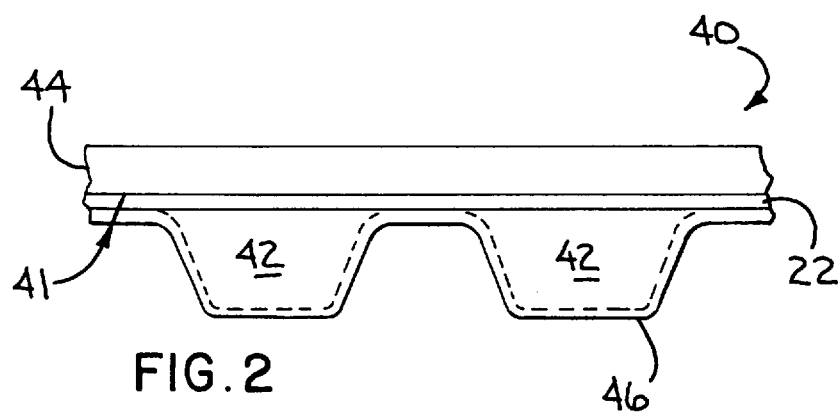
FIG. 2 is a fragmentary, side elevation view of a toothed belt, incorporating the present invention.

The above described cord 22 can be used in belt constructions other than as shown in FIG. 1. For example, the load carrying cord 22 is shown incorporated into a toothed belt 40 in FIG. 2. The belt 40 has a body 41 defining teeth 42 spaced regularly along the length thereof The body 41 has a backside rubber section 44 in which the load carrying cords 22 are embedded. A canvas layer 46 covers the teeth 42 at the inside of the belt.

The rubber defining the backside section 44 and the teeth 42 may be hydrogenated nitrile rubber (HNBR), nitrile-butadiene rubber (NBR), chloroprene rubber (CR), chlorosulfonated polyethylene rubber (CSM), alkylated chlorosulfonated polyethylene (ACSM) and other rubbers having good resistance to deterioration at high temperatures.

The canvas 46 may be a plain weave, a twill weave, or a satin weave having good extensibility in the weft direction, i.e. along the length of the belt. In a plain weave canvas, the weft and warp yarns alternate above and below each other at points of intersection. Accordingly, wave-shaped intersection points are formed throughout. In this regard, twill and satin weave canvases are preferred because this wave-shaped intersection is formed only every several threads. That is, there are fewer wave-shaped intersection points than with plain weave canvas. Rubber fully penetrates not only between the threads but also to between the threads at the intersection points and as a result direct contact between threads of the weft and warp is avoided during bending. Belt life may thereby be increased.

The canvas 46 may be made from aramid fiber, polyester fiber, aromatic polyester fiber, or the like. This fiber has an adhesive layer applied thereto that is at least one of RFL liquid, isocyanate liquid, or epoxy liquid which covers the surfaces of the warp and weft yarns defining the canvas.

Figure 3:
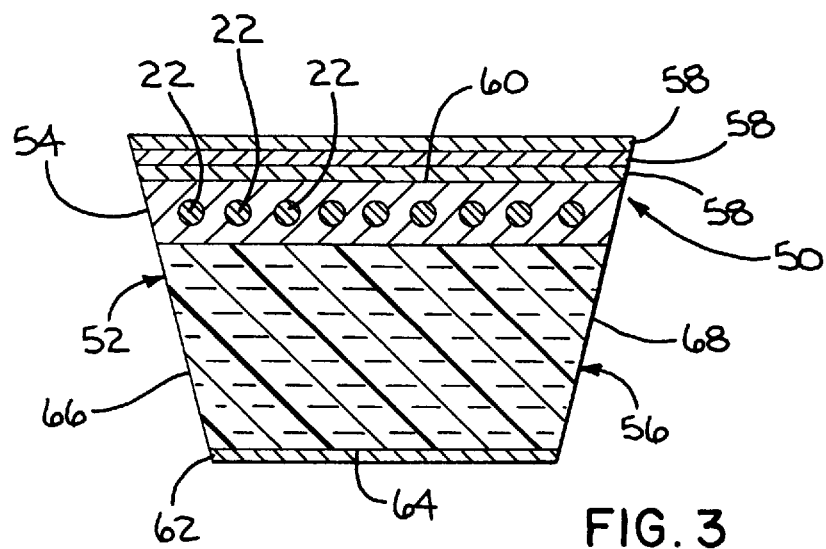
FIG. 3 is a cross-sectional view of a V-belt, incorporating the present invention.

The inventive load carrying cords 22 are shown incorporated into a V-belt at 50 in FIG. 3. The belt 50 has a body 52 with a cushion rubber layer 54 in which the load carrying cords 22 are embedded. A compression rubber layer 56 is provided on the inside of the cushion rubber layer 54. Three rubberized canvas layers 58 are bonded to the outside surface 60 of the cushion rubber layer 56. Another rubberized canvas layer 62 is bonded to the inside surface 64 of the compression rubber layer 56. The laterally spaced side surfaces 66, 68 are cut and uncovered by canvas or other cloth. That is, the rubber defining the cushion rubber layer 54 and the embedded load carrying cords 22 are directly exposed at the sides of the belt body 52.

The performance of the invention will be described with respect to various belt embodiments.

INVENTIVE EMBODIMENT NO. 1

As shown in Table No. 1, 2 or 4 untwisted, 1500 denier aramid fibers (Teijin Ltd. TECHNORA™) filaments were bundled together and twisted with a predetermined number of twists to define a cord.

TABLE 1

| Item | (X) | (Y) |
|---|---|---|
| Starting Thread | TECHNORA *1 1500d | TECHNORA *1 1500d |
| Constitution | 1500d/2 | 1500d/4 |
| Number of Twists (twists/10 cm) | 15.7 | 11.1 |

*1: Teijin Ltd. aramid fiber

In a first treatment step, the resulting cord was immersed in a treating liquid having the composition identified in Table 2, below and heat treated for two minutes at 200° C.

TABLE 2

| Blend | A | B | C |
|---|---|---|---|
| PAPI-135 *2 | 5 | — | — |
| Epicoat 828 *3 | — | 4 | 8 |
| DMP-30 *4 | — | 1 | 2 |
| Toluene | 95 | 95 | 90 |
| Total | 100 | 100 | 100 |

*2: M.D. Chemicals polyisocyanate compound
*3: Shell Chemicals epoxy resin
*4: 2,4,6-trisdimethylaminomethylphenol The cord was then immersed in an RFL liquid in a second treatment step, with the RFL liquid having a composition as shown in Table 3, below.

TABLE 3

| | | (weight parts) |
|---|---|---|
| Blend | D | E |
| H-NBR Latex | 100 | — |
| NBR Latex | — | 100 |
| Resorcinol | 14.6 | 14.6 |
| Formalin | 9.2 | 9.2 |
| Caustic Soda | 1.5 | 1.5 |
| Water | 262.5 | 262.5 |
| Total | 387.8 | 387.8 |

After treatment in the RFL liquid, the cord was heated for one minute at 100° C. and further immersed in the RFL liquid and then heated for two additional minutes at 100° C.

To measure the fraying characteristics and strength maintenance after heat aging and bending, a flat belt was made. The belt was made by winding a first rubber sheet with a thickness of 0.5 mm and a composition as shown in Table 4, below, onto a cylindrical mold.

TABLE 4

| Blend | Weight Parts |
|---|---|
| Zettpole 2020 *5 | 100 |
| Zinc oxide | 5 |
| Stearic Acid | 1 |
| Antioxidant *6 | 2 |
| FEF Carbon Black | 40 |
| Plasticizer *7 | 5 |
| Accelerator TT *8 | 2 |
| Accelerator CM *9 | 1 |
| Sulfur | 0.5 |
| Total | 156.6 |

TABLE 4-continued

| Blend | Weight Parts |
|---|---|

*5: Nippon Zeon Co., Ltd. hydrogenated nitrile rubber
*6: N-isopropyl-N'-phenyl-P-phenylenediamine
*7: dioctylsebacate
*8: tetramethylthiulamdisulfide
*9: N-cyclohexyl-2 benzothiadil.sulfphenamide A cord, as shown in Table 5, below, was wound over the first rubber sheet.

TABLE 5

| | Inventive Embodiment | | | | Comparison Sample | | |
|---|---|---|---|---|---|---|---|
| | 1 | 2 | 3 | 4 | 1 | 2 | 3 |
| Blank Cord | X | X | Y | X | X | X | X |
| First Step Treatment RFL | | | | | | | |
| Liquid | A | B | B | B | C | A | A |
| Solid Adhered Amount (wt %) | 1.8 | 1.9 | 1.7 | 1.7 | 3.7 | 1.8 | 1.7 |
| Second Step Treatment | | | | | | | |
| Liquid | D | D | D | E | D | D | D |
| Void Percentage (%) | 0.9 | 0.8 | 1.0 | 0.9 | 0.8 | 1.9 | 2.3 |
| Fraying Performance (5 levels) | A | A | A | A | A | C | D |
| Strength Maintenance After Heat Aging and Bending (%) | 58 | 60 | 57 | 54 | 40 | 59 | 61 |
| Evaluation | ○ | ○ | ○ | ○ | x | x | x |

A second rubber sheet, having the same thickness as the first rubber sheet, was then wound over the cord, with these components then vulcanized. A flat belt with a width of 3 mm, a thickness of 1.4 mm, and an outer peripheral length of 1000 mm was cut from the above components.

The results of the tests are shown in Table 5, above.

FRAYING PERFORMANCE

The belts were cut to a width of 2 cm and the degree of fraying of the cord exposed at the cut surface was evaluated by visual observation. The degree of fraying was identified as five levels (A to E), with A being good and E being poor.

STRENGTH MAINTENANCE AFTER HEAT AGING AND BENDING

A sample of flat belt having two cords embedded therein was aged by heating for 3 days at 140° C. A bar bending test was carried out. The strength of the cord before bending and after bending 10,000 times was measured. The cord strength after bending was divided by the cord strength before bending to find the percentage strength maintenance.

In the bar bending test, one end of the flat belt was fixed and the flat belt was coiled with two bars having a diameter of 10 mm and a load of 2 kgf applied to the other end of the belt and was bent by the two bars which were moved up and down 100 times per minute.

It can be seen from this testing that the fraying performance and the bending fatigue resistance for belts treated in two steps within the parameters of the invention were very good.

The foregoing disclosure of specific embodiments is intended to be illustrative of the broad concepts comprehended by the invention.

We claim:

1. A power transmission belt comprising:

a body having a length, a width between laterally spaced sides, an inside and an outside, there being at least one load carrying cord embedded in the body and extending lengthwise of the body, said cord comprising fiber that is treated in a first step with at least one of a) an isocyanate compound and b) an epoxy compound such that after the first step the at least one of the isocyanate compound and epoxy compound is present in solid form in an amount equal to 0.5–2.0 weight %, said fiber cord being treated after the first step in a second step with an RFL liquid so that the percentage void in the cord, as determined by the following formula, is not greater than 1.5%:

percentage void=$100 \times A_y/A_x$, where $A_x$ is the total surface area of the cord and $A_y$ is the void area.

2. The power transmission belt according to claim 1 wherein the RFL liquid comprises at least one of hydrogenated acrylonitrile-butadiene rubber latex and acrylonitrile-butadiene rubber latex.

3. The power transmission belt according to claim 2 wherein the load carrying cord comprises at least one of aramid fiber and polyparaphenylene benzobisoxazole fiber.

4. The power transmission belt according to claim 3 wherein the power transmission belt comprises at least one of a V-belt, a V-ribbed belt and a toothed belt.

5. The power transmission belt according to claim 4 wherein there is a canvas layer disposed on at least one of the inside and outside of the body.

6. The power transmission belt according to claim 4 wherein the body comprises rubber that is directly exposed at the sides of the body.

* * * * *